United States Patent [19]

Divan et al.

[11] Patent Number: 5,272,616
[45] Date of Patent: Dec. 21, 1993

[54] SINGLE PHASE TO THREE PHASE POWER CONVERTER FOR MOTOR LOADS

[75] Inventors: Deepakraj M. Divan; Donald W. Novotny; Chingchi Chen, all of Madison, Wis.

[73] Assignee: Wisconsin Alumni Research Foundation, Madison, Wis.

[21] Appl. No.: 871,500

[22] Filed: Apr. 21, 1992

[51] Int. Cl.[5] .......................................... H02M 5/293
[52] U.S. Cl. ....................................... 363/49; 363/36; 363/148; 323/908; 318/768
[58] Field of Search .................... 363/1, 2, 4, 10, 36, 363/49, 148, 151, 154; 323/908; 318/768

[56] References Cited

U.S. PATENT DOCUMENTS 3,522,502  8/1970  Tuchen .
3,527,995  9/1970  Lee et al. .
4,060,754  11/1977  Kirtley, Jr. et al. .
4,618,809  10/1986  Maeda .
4,899,268  2/1990  Hollinger .
5,017,800  5/1991  Divan .

FOREIGN PATENT DOCUMENTS 60-245471  12/1985  Japan .
211132  6/1983  United Kingdom .

OTHER PUBLICATIONS

S. B. Dewan, et al., "Steady-State Analysis of Static Single-Phase to Three-Phase Converters," IEEE IAS Conf. Rec., 1981, pp. 910–915.
S. K. Biswas, "A New Static Converter For The Operation of Three-Phase Motors on Single-Phase Supply," IEEE IAS Conf. Rec., 1986, pp. 1550–1554.
S. I. Khan, et al., "A Novel Single to Three Phase Static Converter," IEEE IAS Conf. Rec., 1987, pp. 658–665.
L. H. Soderholm, et al., "Automatic Balance of Three-Phase Motor Currents for Variable Motor Loading Using a Static Phase Converter," IEEE Trans. on Industry Applications, vol. 26, No. 4, Jul./Aug. 1990, pp. 679–682.
C. Chen, et al., "Simple Topologies For Single Phase AC Line Conditioning," Conference Record, IEEE-IAS Annual Meeting, Oct. 1991, pp. 911–917.
P. Enjeti, et al., "A Low Cost Single Phase to Three Phase Static Power Converter," to be published at IEEE Rural Electronics Conference, May 1992.

Primary Examiner—Emanuel T. Voeltz
Attorney, Agent, or Firm—Foley & Lardner

[57] ABSTRACT

An apparatus for converting single phase input power to three phase output power supplied to a motor includes a pair of input lines, and a pair of DC bus lines, a pair of capacitors, a pair of diodes, and a pair of controlled switching devices which are each connected between the DC bus lines. One of the input lines is connected to the node between the capacitors and the other input line is connected to the node between the diodes. Two output lines are connected to the input line and a third output line is connected to the node between the two switching devices, with the three output lines being connected to a motor to supply three phase power to the motor. The switching devices are switched in a pulse width modulated manner to provide a voltage between the third output line and the other two output lines which provides the three phase power. During motor startup, at least one startup capacitor is switched in between one or both of the input lines and the output lines to provide startup torque for the motor. This capacitor is switched out after the motor has been started. A capacitor may also be switched in between the two input lines during startup to reduce the in-rush current on the input lines. Conversion of single phase to three phase power is obtained with only two active switching devices and a simple control strategy.

19 Claims, 6 Drawing Sheets

FIG. 7 speed 300 rpm/div $I_a$ 20A/div 0.5 sec/div

SINGLE PHASE TO THREE PHASE POWER CONVERTER FOR MOTOR LOADS

FIELD OF THE INVENTION

This invention pertains generally to the field of electrical power conversion systems and particularly to power converters for converting single phase power to three phase power.

BACKGROUND OF THE INVENTION

Single phase motors, particularly those in the integral horse power range, typically have lower performance and higher cost than three phase motors. Consequently, where three phase power is available for applications requiring all but the smallest drive motors, three phase motors are typically used. However, many rural areas of the United States are supplied only with single phase AC power. Thus, farms and other agricultural operations which require electric motor drives have commonly been limited to using single phase motors.

Various solutions have been proposed for converting single phase power to three phase power to allow three phase motors to be utilized where only single phase power is available. Some single phase to three phase converters have been available commercially. Nonetheless, the relatively significant additional cost associated with the single phase to three phase converter has limited the widespread use of three phase motors in agricultural applications.

SUMMARY OF THE INVENTION

The present invention provides a low cost converter which has a circuit structure and control strategy which provides three phase power drive for three phase motors from a single phase AC supply, such as that available in rural areas. The circuit and control structure requires only two controlled switches, such as transistors, thereby minimizing the cost of the circuit, while yielding balanced phase voltages which provide adequate performance. Further, the circuit of the present invention is capable of providing motor startup, and limiting in-rush current during startup, with minimal additional components.

The converter circuit of the present invention has two AC input terminals and input lines connected thereto, a pair of DC bus lines, a pair of capacitors connected across the DC bus lines with a node between the capacitors connected to one of the input lines, and a pair of rectifying diodes connected across the DC bus lines with a node connecting the diodes being connected to the other input line. An inverter composed of two controlled switches, such as transistors, are connected together in series across the DC bus lines. Two output lines are connected to the two input lines, and a third output line is connected to a node between the two switching devices. The switching devices are controlled to provide a desired phase voltage between the third output line and the other two output lines, which preferably is a leading voltage with respect to the voltage across the two input lines. The switching devices are preferably also controlled so that the current on the third output line is substantially sinusoidal. The magnitude of the voltage between the third output line and the first two output lines can be balanced to match the voltage across the first two output lines.

The circuit of the present invention can yield starting torque sufficient to handle a majority of intended applications. During startup, a starting capacitor is preferably switched in between one or both of the input lines and the third output line. The capacitor draws current orthogonal to the voltage between the output line and the input line to which the capacitor is connected. The capacitor is switched out after startup has been accomplished. To reduce line in-rush current during startup, another starting capacitor and switch may be connected across the two input lines. After startup, this capacitor is also switched out. During the starting sequence, the inverter of the present invention operates continuously even with the starting capacitor or capacitors switched in, so that there is no disruption of power supplied to the motor during the switch-out of the starting capacitors. The circuit of the present invention thus allows current to be limited to one per unit (p.u.) while nonetheless achieving adequate startup of the motor.

Switching of the controlled switches in the inverter may be accomplished utilizing a feedback loop so that the output voltage from the third output line is capable of adapting to disturbances. To prevent over voltages and currents, current and voltage limiters are preferably included in the controller for the inverter switches.

Further objects, features and advantages of the invention will be apparent from the following detailed description when taken in conjunction with the accompanying drawings.

DETAILED DESCRIPTION OF THE INVENTION

Figure 1:
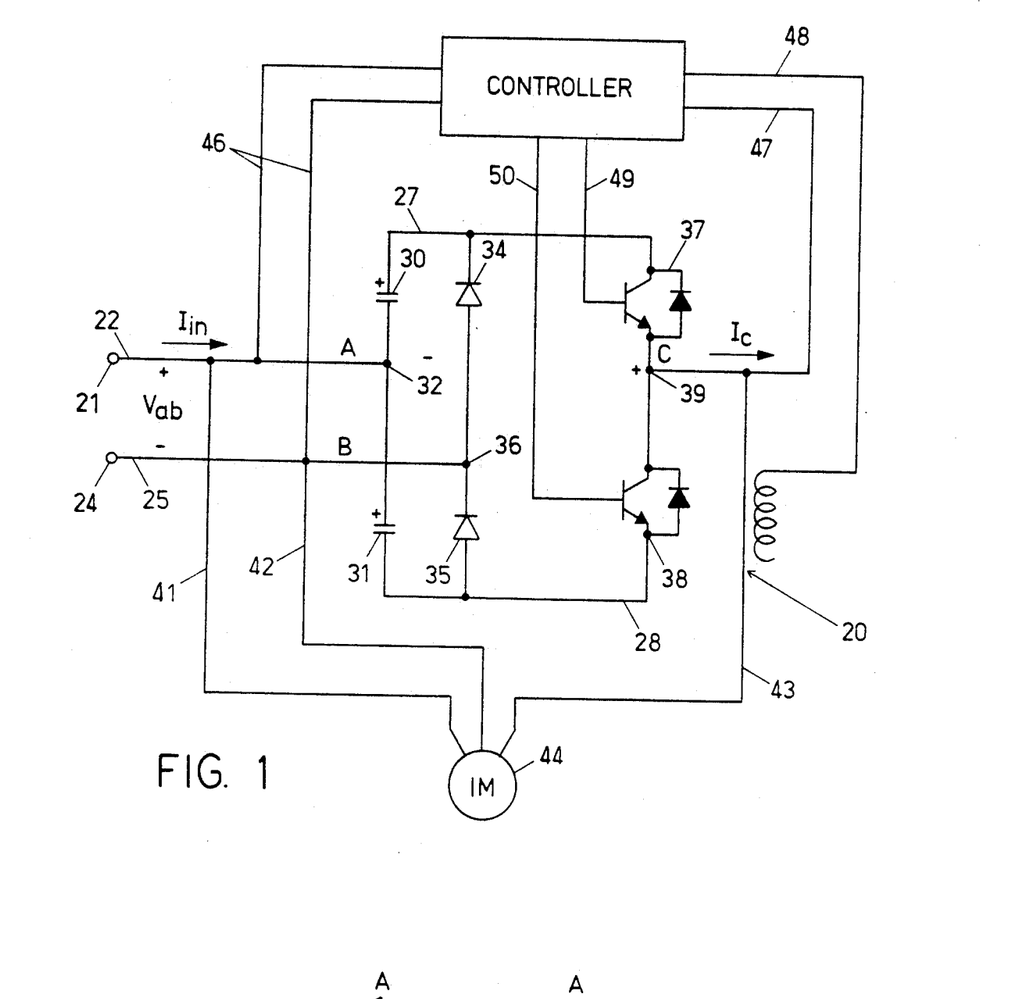
FIG. 1 is a schematic circuit diagram of a single phase to three phase converter for a motor drive in accordance with the present invention.

A basic single phase to three phase converter in accordance with the present invention is shown generally at 20 in the schematic circuit diagram of FIG. 1. Single phase AC input power is received at a first input terminal 21 connected to a first input line 22 and at a second input terminal 24 connected to a second input line 25.

The voltage $V_{ab}$ across the input terminals 21 and 24 is a single phase voltage such as 120 volt RMS power obtained from a commercial power system. The converter 20 has a pair of DC bus lines 27 and 28. A pair of capacitors 30 and 31, connected together at a node 32, are connected across the bus lines 27 and 28. The node 32 is also connected to the one input line 22. A pair of rectifier diodes 34 and 35, connected together at a node 36, are also connected across the DC bus lines 27 and 28. The node 36 is connected to the other of the input lines 25. A pair of controllable switching devices 37 and 38, specifically gate turn off switching devices such as the bipolar transistors (e.g., insulated gate bipolar transistors) shown in FIG. 1, are connected together at a node 39 and connected across the DC bus lines 27 and 28. A first output line 41 is connected to the input line 22, a second output line 42 is connected to the second input line 25, and a third output line 33 is connected to the node 39 between the switching devices 37 and 38. The three output lines 41, 42 and 43 form the three phase output power lines of the device and are connected to a three phase load such as the motor 44 shown in FIG. 1. A controller 45 receives the voltage $V_{ab}$ from a monitor line 46, the voltage on the output line 43 on a monitor line 47, and an output current signal from a current monitor on a line 48, and provides switching control signals to the gates of the devices 37 and 38 on lines 49 and 50.

Figure 2:
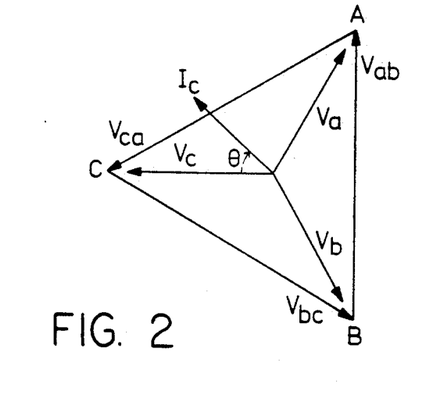
FIG. 2 is a phasor diagram for operation of the circuit of FIG. 1 in a positive sequence.
Figure 3:
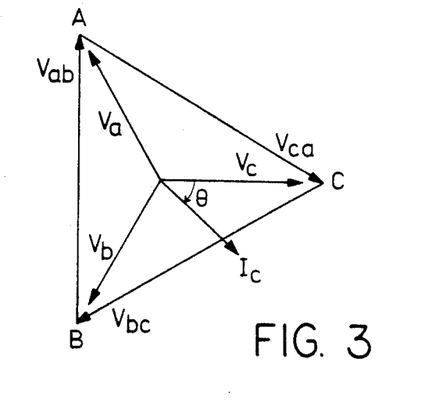
FIG. 3 is a phasor diagram for the operation of the circuit of FIG. 1 in a negative sequence.
Figure 4:
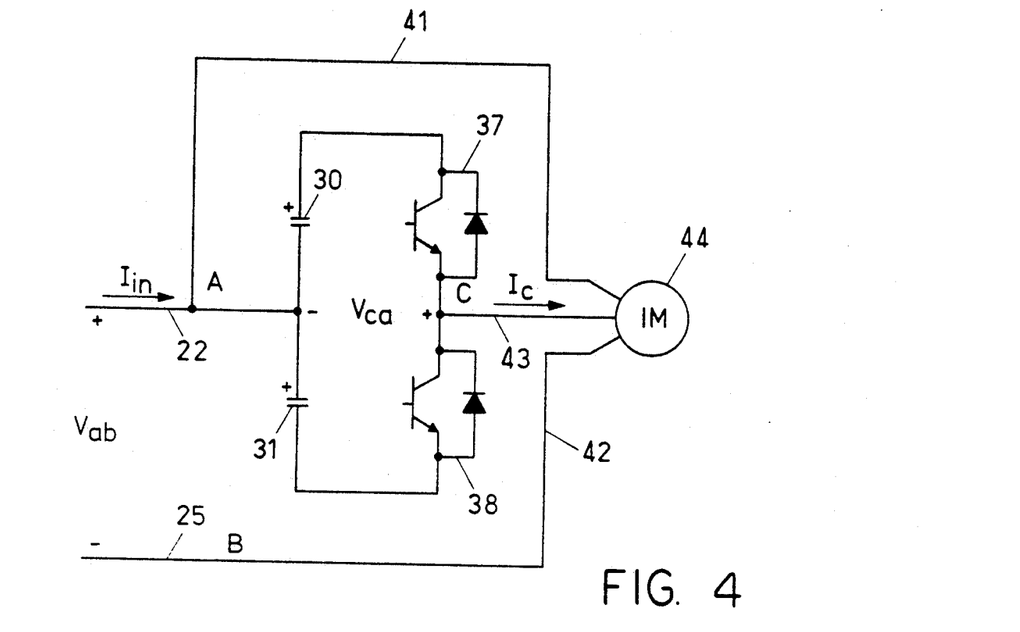
FIG. 4 is a simplified circuit diagram for the converter circuit of FIG. 1.

The AC input voltage across the terminals 21 and 24 forms one of the line to line phase voltages, $V_{ab}$, supplied to the motor 44. The inverter composed of the switching devices 37 and 38 is controlled to generate a third phase voltage with either a leading or lagging phase shift of $\pi/3$ with respect to the incoming voltage. A phasor diagram showing a leading phase shift for the phase voltages is illustrated in FIG. 2 and a phasor diagram showing a lagging phase voltage is shown in FIG. 3. The leading phase voltage mode is preferable since the input power factor is improved and the output current distortion is found to be lower.

Figure 5:
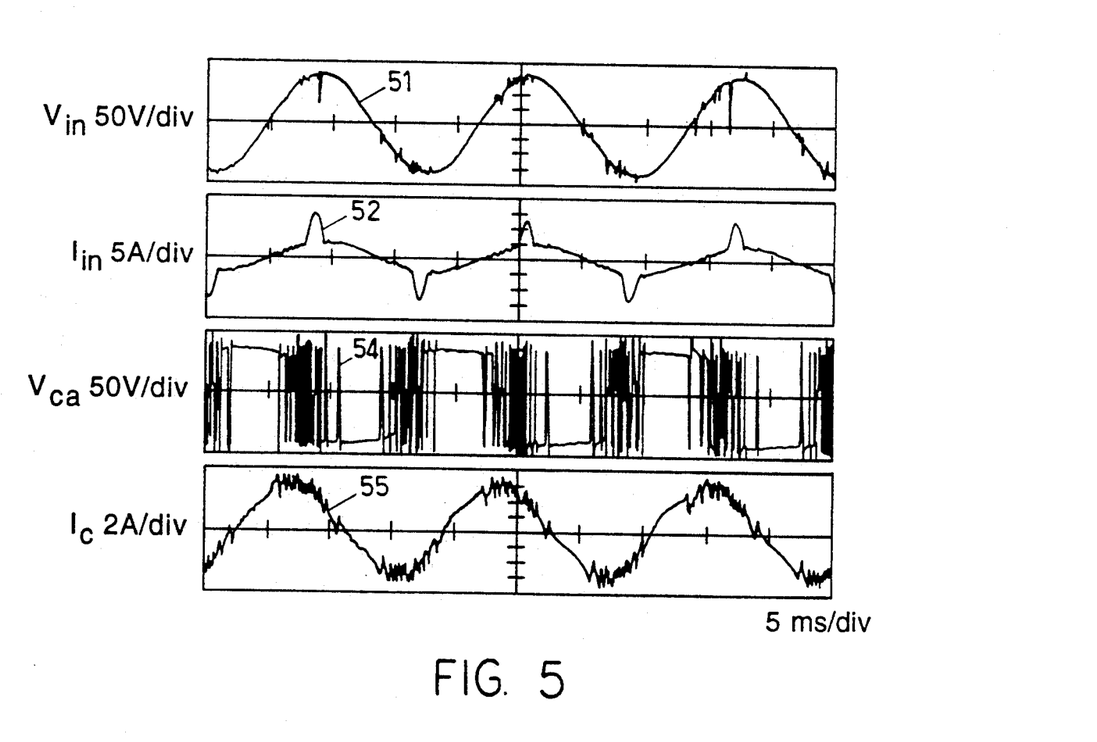
FIG. 5 are voltage and current graphs showing steady state operation of the converter of the invention driving, for example, a three horsepower three phase induction motor.

The operation of the inverter can be understood by noting that the diodes 34 and 35 conduct for a very short duration during each fundamental cycle. Consequently, the fundamental frequency behavior can be modeled by ignoring the diodes. This results in a simplified equivalent circuit as shown in FIG. 3. Under steady state conditions, the inverter must provide a balanced three phase fundamental voltage to the motor. The inverter can generate an output voltage which essentially equals the input voltage magnitude depending on voltage drops in the various devices and the DC bus ripple. In general, the inverter may need to be overmodulated, but balanced operation is nonetheless possible with acceptable distortion in the motor output waveform. FIG. 5 illustrates results for an exemplary three horsepower three phase induction motor driven in the steady state by the circuit of FIG. 1 for a leading mode of operation. The graph 51 is the input voltage, the graph 52 is the input current, the graph 54 is the phase voltage $V_{ca}$ and the graph 55 is the third phase current $I_c$. As apparent in FIG. 5, the output current $I_c$ is controlled to be essentially a sinusoid utilizing the controller structure described below.

Figure 6:
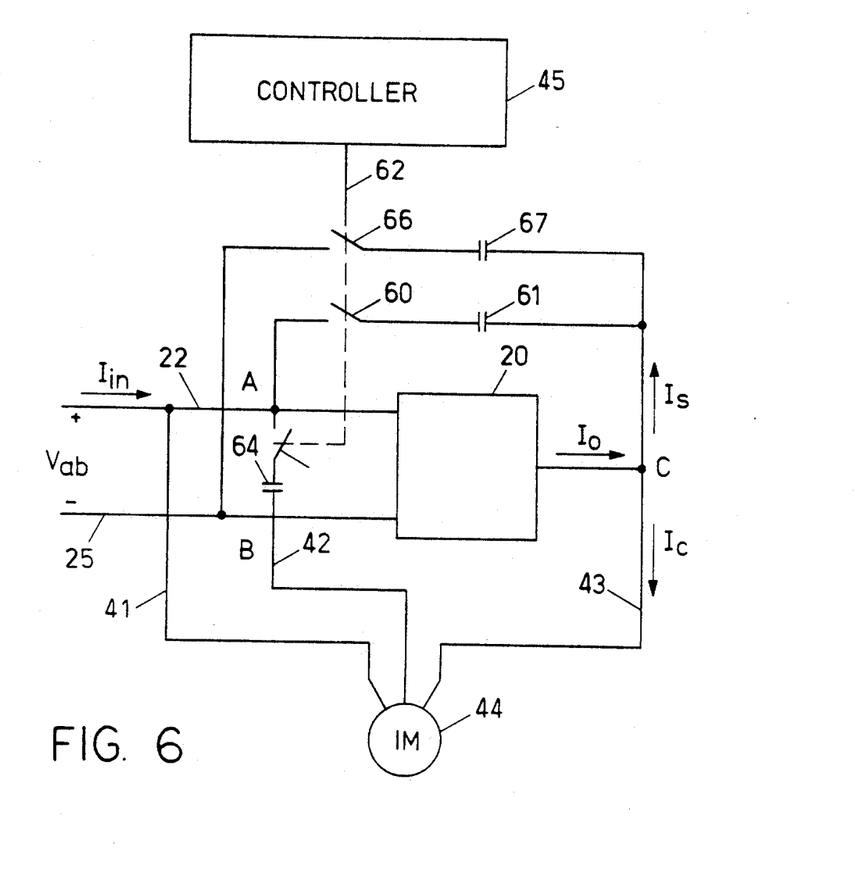
FIG. 6 is a schematic circuit diagram of the converter circuit of the invention incorporating starting capacitors which can be switched in to allow starting of the motor.
Figure 7:
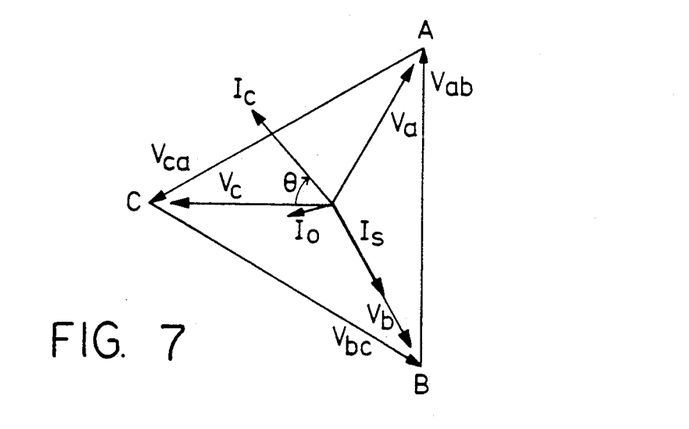
FIG. 7 is a phasor diagram showing the operation of the circuit of FIG. 6 during starting.

During motor startup, it is necessary that the starting torque obtained be sufficient to handle the intended load connected to the motor. The converter 20, as shown in FIG. 1, under steady state conditions can drive the motor but would not provide sufficient torque during startup. To obtain startup torque, a controllable switch 60 and a capacitor 61 are connected in series between the input line 22 and the output line 43 as illustrated in FIG. 6. The switch 60 may comprise appropriate gate-turn-off semiconductor devices, or more simply a normally open mechanical relay, since the switch is left closed during the startup phase and then left open thereafter. A control line 62 extends from the controller 45 to energize the relay 60. The phasor diagram of FIG. 7 shows that the capacitor 61 will draw current orthogonal to the third phase voltage $V_{ca}$, which reduces the inverter current demand from 3-5 p.u., which is typical for full voltage startup induction mode, to a much smaller value. Preferably, the inverter is operated with a current limit set at 1 p.u. The switch 60 is opened by the controller 45 to switch out the capacitor 61 after startup has been accomplished. If desired, line in-rush current during startup can be reduced by utilizing a switch 63 and a capacitor 64 connected in series across the input lines 22 and 25. The switch 63 is also closed during startup, and may be controlled by the signal on the line 62, and the capacitor 64 serves to reduce the in-rush current to a desired level. To provide further enhanced starting capability, another controllable switch 66 (e.g., a relay) and a capacitor 67 may be connected across the second input line 25 and the output line 43, with the two switches 60 and 66 being closed during startup and opened at the same time after startup has been achieved by the signal on the line 62.

Figure 8:
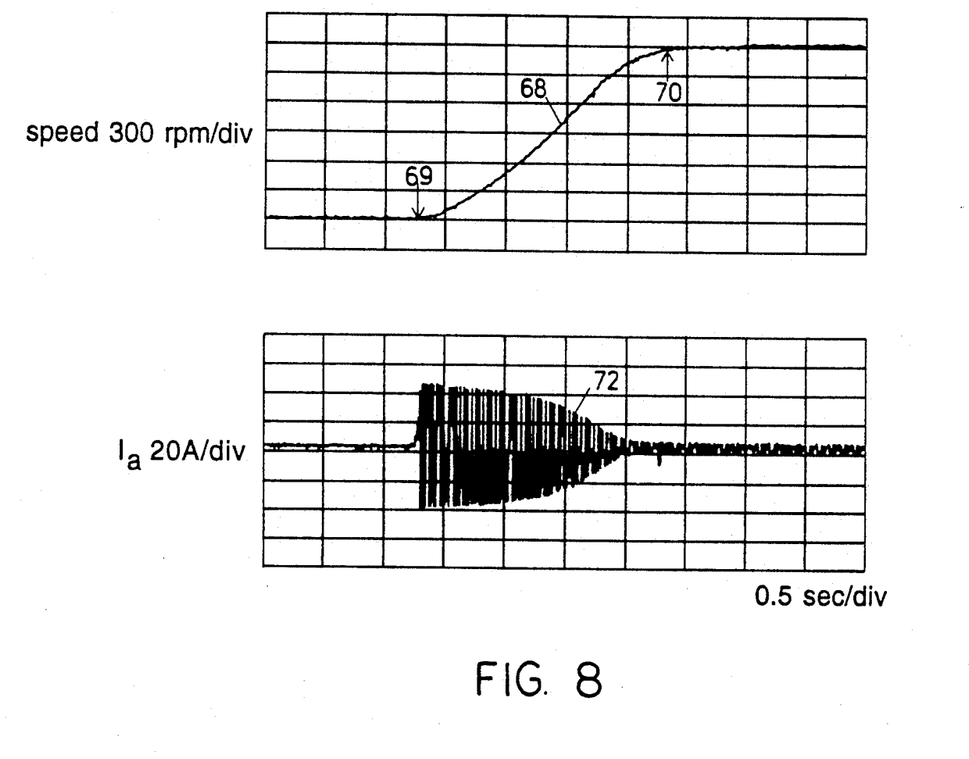
FIG. 8 are graphs showing motor speed and phase current of an illustrative example of start-up of a motor utilizing the circuit of the present invention.
Figure 9:
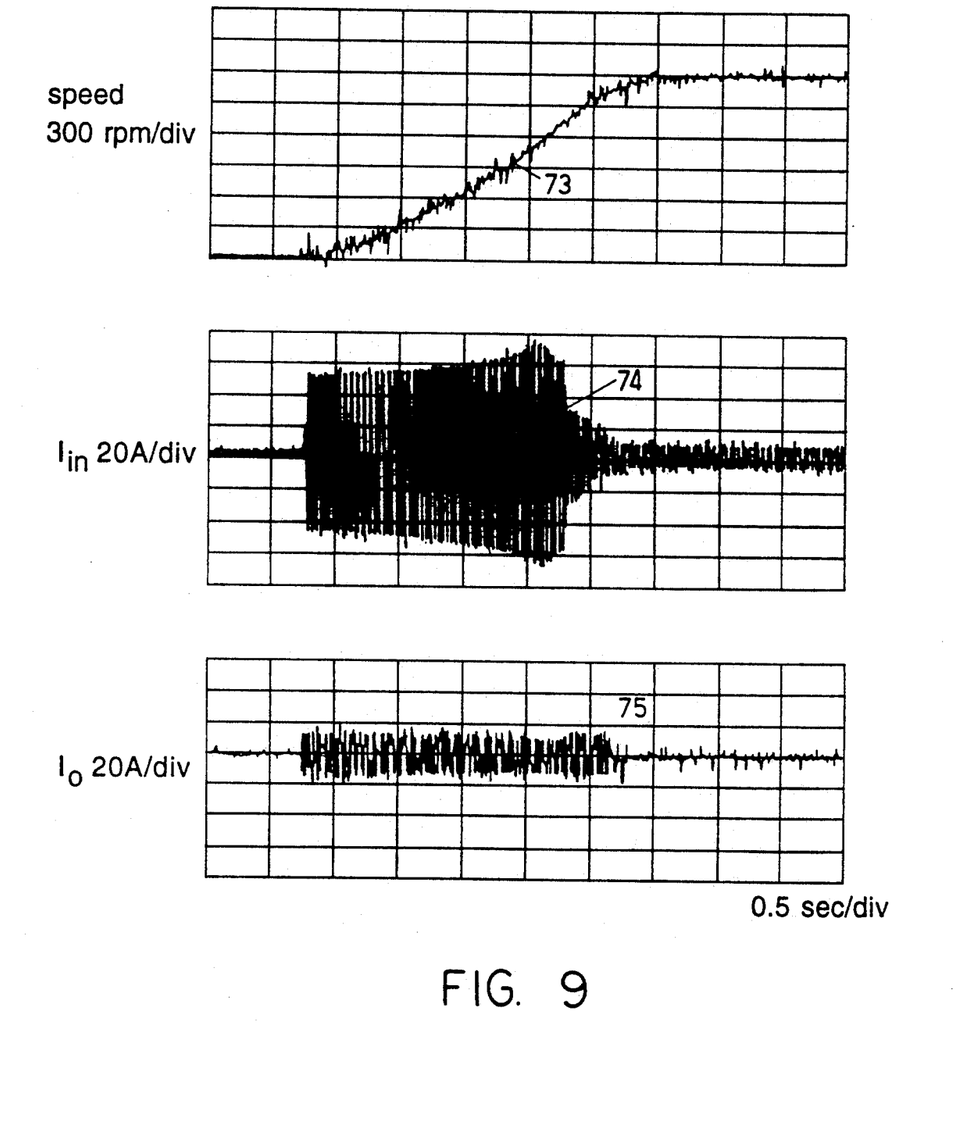
FIG. 9 are graphs showing speed, input current and converter output current for an illustrative example of a motor started by the converter of the present invention.

Exemplary results for the circuit of FIG. 6 during startup are shown in FIG. 8. The graph 68 shows motor speed as a function of time during startup, from the initiation of startup at the point in time 69, to the point 70 at which the capacitor 61 is switched out of the circuit. The motor phase current $I_a$ is shown by the graph 72 during the startup phase. The graphs of FIG. 8 were obtained for three horsepower three phase motor started by a 60 Hz, 120 V balanced power source, with the value of the capacitor 61 being 450 $\mu$F. The graph 73 of FIG. 9 is a somewhat magnified view of the motor speed during startup, the graph 74 shows the input current $I_m$, and the graph 75 shows converter output current $I_o$.

Figure 10:
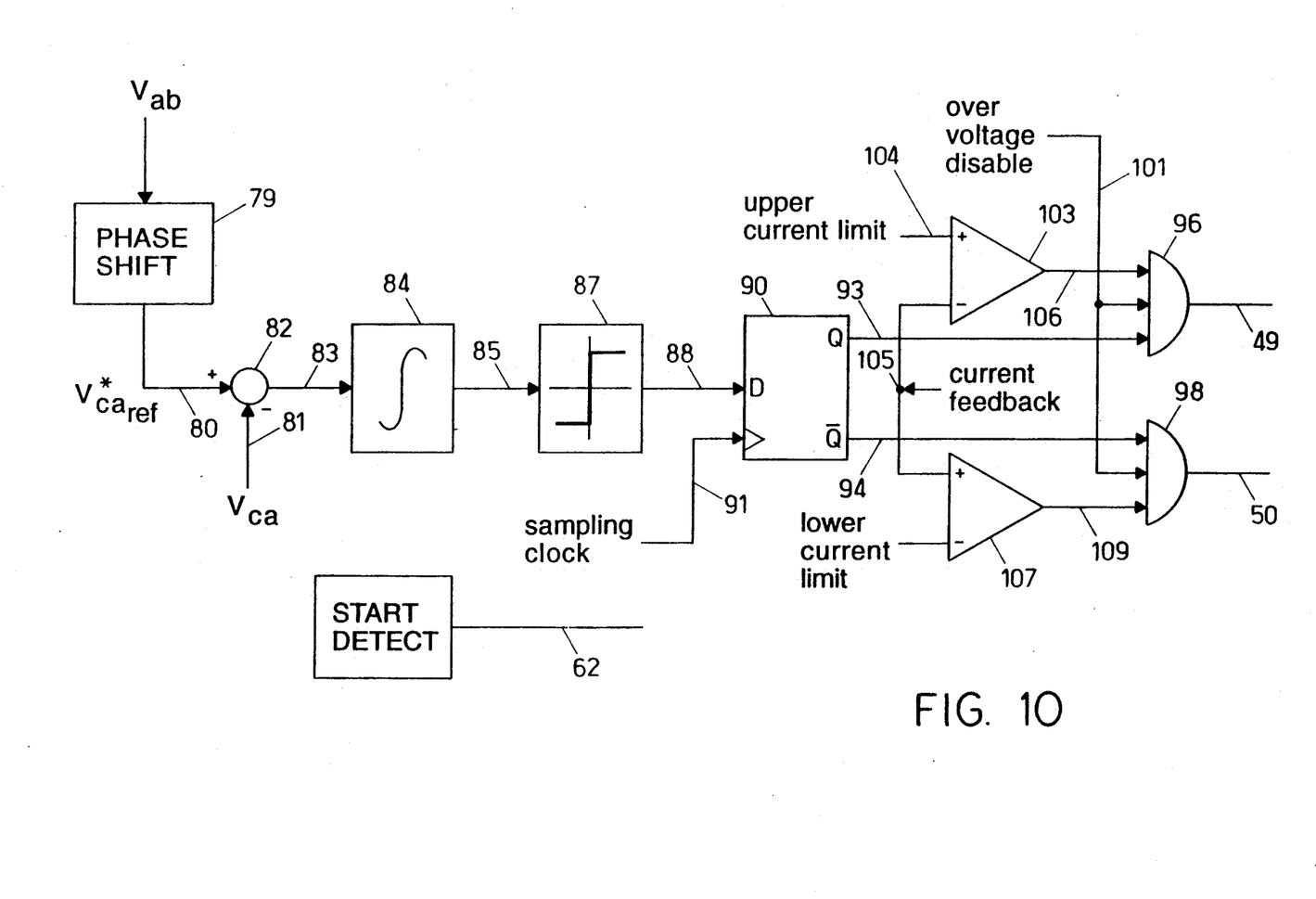
FIG. 10 is a block diagram of a controller for the switching of the controlled switches of the single phase to three phase converter of the present invention.

A block diagram of an exemplary controller for the single phase to three phase converter of the present invention during steady state operation is shown in FIG. 10. In the controller example shown, a reference voltage $V_{ca}^*$, generated for example by a phase shifter 79 receiving the voltage $V_{ab}$ across the input lines and providing a leading phase of $\pi/3$, is provided on an input line 80 to a summing junction 82, and the actual phase voltage $V_{ca}$ is provided on a line 81 to the summing junction 82. The output of the summing junction 82 on a line 83 is provided to an integrator 84 to provide a smooth output signal on a line 85 to a limiter 87. The output of the limiter on a line 88 is provided to the input of a flip-flop 90 which receives at its clock input a sampling clock signal on a line 91. The non-inverting output of the flip-flop 90 is provided on a line 93 to an AND gate 97, the output of which on the line 49 is provided to the gate of the first switching device 37. The inverted output of the flip-flop 90 is provided on line 94 to an AND gate 98, the output of which on the line 50 is provided to the gate of the second gate turnoff switching device 38. The AND gates 36 and 98 also receive as inputs an over voltage disable signal from a line 101 (e.g., as provided from a comparator comparing output voltage to a reference). A comparator 103 receives an upper current limit voltage (e.g., from a potentiometer) on a line 104 to its positive input and an output maximum current feedback signal on a line 105 to its negative input. The output of the comparator 103 is also provided as an input to the AND gate 96. A comparator 107 receives a lower current limit voltage (e.g., from a potentiometer) on a line 107 and the current feedback signal 105, and provides its output on a line 109 to another input on the AND gate 108. The current feedback signal 105 provides the output current from the inverter 10 (e.g. as monitored by the line 48). The over-voltage disable signal thus will drive the outputs of the AND gates 96 and 98 to an off state whenever an overvoltage occurs. When an upper current limit is reached, the AND gate 96 will be turned off, and when a lower current limit is reached, the AND gate 98 will turned off. It is seen from the circuit of FIG. 10 that the signals provided to the gates of the inverter switches 37 and 38 will cause these switches to switch in a modulated manner to have the output voltage follow the reference voltage $V_{ca}^*$ and will correct for any disturbances in the output voltage as a result of the feedback signal of the actual phase voltage $V_{ca}$, and will produce a substantially sinusoidal output voltage. The control signal on the line 62 to the relay switches 60, 64 and 66 is generated by a starting detector 115. The starting detector may be implemented in various conventional ways, for example, by examining the phase of motor current to determine the slip of the motor, by a speed detector or a throw-out switch on the motor, and by comparing the magnitude of motor current with a threshold indicative of the motor reaching running speed.

It is understood that the invention is not limited to the particular embodiments set forth herein, but embraces such modified forms thereof as come within the scope of the following claims.

We claim:

1. Apparatus for converting a single phase AC input to a three phase AC output comprising:
   (a) a pair of single phase AC input terminals connected to a pair of input lines;
   (b) a pair of DC bus lines;
   (c) a pair of capacitors connected together at a node and connected across the DC bus lines, the node between the capacitors connected to one of the input lines;
   (d) a pair of rectifying diodes connected together at a node and connected across the DC bus lines, the node between the diodes connected to the other of the input lines so that the voltage across the input lines is rectified and applied through a diode to each capacitor;
   (e) an inverter comprised of two gate controlled switching devices connected together at a node and connected across the DC bus lines;
   (f) two output lines connected to the two input lines and a third output line connected to the node between the two gate controlled switching devices to provide an output voltage between these two switching devices, the three output lines constituting the three phase output terminals of the apparatus; and
   (g) means for switching the switching devices of the inverter to provide an AC voltage at the three output terminals of the apparatus which constitutes three phase voltages and to provide a substantially sinusoidal output current on the third output line, including a feedback loop feeding back the voltage between the third output line and one of the input lines and comparing the voltage fed back to a desired voltage comprising the voltage across the input lines phase shifted by $\pi/3$ to control the switching of the switching devices and enable the output voltage to adapt to disturbances.

2. The apparatus of claim 1 wherein the means for switching provides a phase angle of the voltage between the third output line and the two input lines with respect to the voltage across the two input lines that is a leading phase.

3. The apparatus of claim 2 wherein the voltage on the third output line with respect to the two input lines leads the voltage across the two input lines by phase of $\pi/3$.

4. The apparatus of claim 1 wherein the controlled switching devices are bipolar transistors.

5. The apparatus of claim 1 wherein the means for switching the switching devices switches the devices in a pulse width modulation manner.

6. The apparatus of claim 1 including a starting capacitor and a controllable starting switch connected in series between one of the input lines and the third output line, and means for closing the switch during the starting of a motor connected to the output lines while the inverter is providing power on the third output line to the motor and for opening the controllable switch to take the starting capacitor out of the circuit after the motor has been started.

7. The apparatus of claim 6 including a second controllable starting switch and a second starting capacitor connected in series between the other of the input lines and the third output line, the first and second starting switches being switched in at the same time to start the motor and being switched out at the same time to disconnect the starting capacitors from the motor after the motor has been started.

8. The apparatus of claim 1 including a controllable switch and a capacitor connected in series between the two input lines and means for closing the switch during starting of the motor to limit the in-rush current on the input lines.

9. Apparatus for converting a single phase AC input to a three phase AC output which is connected to a three phase motor comprising:
   (a) a pair of single phase AC input terminals connected to a pair of input lines;
   (b) a pair of DC bus lines;
   (c) a pair of capacitors connected together at a node and connected across the DC bus lines, the node between the capacitors connected to one of the input lines;
   (d) a pair of rectifying diodes connected together at a node and connected across the DC bus lines, the node between the diodes connected to the other of the input lines;
   (e) an inverter comprised of two gate controlled switching devices connected together at a node and connected across the DC bus lines;
   (f) two output lines connected to the two input lines and a third output line connected to the node between the two gate controlled switching devices to provide an output voltage between these two switching devices, the three output lines constituting the three phase output terminals of the apparatus;
   (g) means for switching the switching devices of the inverter to provide an AC voltage at the three output terminals of the apparatus which constitutes three phase voltages; and (h) a starting capacitor and a controllable starting switch connected in series between one of the input lines and the third output line, and means for closing the starting switch during the starting of a motor connected to the output lines while the inverter is providing power on the third output line to the motor under control of the means for switching and for opening the controllable switch to take the starting capacitor out of the circuit after the motor has been started.

10. The apparatus of claim 9 wherein the means for switching provides a phase angle of the voltage between the third output line and the two input lines with respect to the voltage across the two input lines that is a leading phase.

11. The apparatus of claim 10 wherein the voltage on the third output line with respect to the two input lines leads the voltage across the two input lines by phase of $\pi/3$.

12. The apparatus of claim 9 wherein the controlled switching devices are bipolar transistors.

13. The apparatus of claim 1 wherein the means for switching the switching devices switches the devices in a pulse width modulation manner.

14. The apparatus of claim 9 including a second controllable starting switch and a second starting capacitor connected in series between the other of the input lines and the third output line, the first and second starting switches being switched in at the same time to start the motor and being switched out at the same time to disconnect the starting capacitors from the motor after the motor has been started.

15. The apparatus of claim 9 including a controllable switch and a capacitor connected in series between the two input lines and means for closing the switch during starting of the motor to limit the in-rush current on the input lines.

16. The apparatus of claim 9 wherein the means for switching switches the switching devices to provide a substantially sinusoidal output current on the third output line.

17. The apparatus of claim 1 wherein the means for switching monitors the output current of the inverter and controls the switching of the switching devices to limit the output current.

18. The apparatus of claim 9 wherein the means for switching monitors the output current of the inverter and controls the switching of the switching devices to limit the output current.

19. The apparatus of claim 18 wherein the means for switching includes a feedback loop feeding back the voltage between the third output line and one of the input lines and comparing the voltage fed back to a desired voltage comprising the voltage across the input lines phase shifted by $\pi/3$ to control the switching of the switching devices and enable the output voltage to adapt to disturbances.

* * * * *